United States Patent [19]
Farrington

[11] Patent Number: 5,883,793
[45] Date of Patent: Mar. 16, 1999

[54] CLAMP CIRCUIT FOR A POWER CONVERTER AND METHOD OF OPERATION THEREOF

[75] Inventor: Richard W. Farrington, Heath, Tex.

[73] Assignee: Lucent Technologies Inc., Murray Hill, N.J.

[21] Appl. No.: 69,909

[22] Filed: Apr. 30, 1998

[51] Int. Cl.⁶ .................................................. H02M 3/335
[52] U.S. Cl. .................. 363/16; 363/97; 363/25
[58] Field of Search .................................. 363/16, 17, 24, 363/25, 97, 98, 131, 132, 133, 134

[56] References Cited

U.S. PATENT DOCUMENTS

| | | | |
|---|---|---|---|
| 5,640,318 | 6/1997 | Leu | 383/131 |
| 5,781,419 | 7/1998 | Kutkut et al. | 363/17 |
| 5,801,932 | 9/1998 | Hwang et al. | 363/97 X |

*Primary Examiner*—Peter S. Wong
*Assistant Examiner*—Y. J. Han

[57] ABSTRACT

For use with a power converter having first and second power switches coupled between a converter input and a primary winding of a transformer to impress an input voltage across the primary winding, a voltage clamp circuit for, and method of, resetting the transformer and a power converter employing the clamp circuit or the method. In one embodiment, the clamp circuit includes: (1) first and second reset windings coupled between the first and second power switches, (2) first and second energy storage devices coupled between the primary winding and the first and second reset windings, respectively, and (3) first and second switching circuits, coupled to the first reset winding and the second reset winding, respectively, that provide an electrical path from the primary winding to the converter input through the first and second reset windings, respectively, when the first and second power switches are not conducting.

21 Claims, 2 Drawing Sheets

CLAMP CIRCUIT FOR A POWER CONVERTER AND METHOD OF OPERATION THEREOF

TECHNICAL FIELD OF THE INVENTION

The present invention is directed, in general, to power supplies and, more specifically, to a clamp circuit for a power converter, method of operation thereof and power converter employing the clamp circuit.

BACKGROUND OF THE INVENTION

Increased power density is a continuing goal of modern power supply design. High power density is particularly crucial in applications wherein the allocated space for the power supply relative to the power output is restricted. In addition to being highly compact, the power supply must also be efficient to limit heat-creating power dissipation.

In low to medium level power applications (e.g., 50 to 800 watts), a forward converter topology is widely used. A DC/DC forward converter generally includes an isolation transformer, a switch on a primary side of the transformer, and a rectifier and output filter on a secondary side of the transformer. The switch, coupled in series with a primary winding of the transformer, converts an input DC voltage into an AC voltage. The transformer then transforms the AC voltage to another value and the rectifier generates therefrom a desired DC voltage that is filtered by the output filter at an output of the forward converter.

A conventional forward converter topology contains a single switch, typically a semiconductor device, sized to withstand the input voltage. Many applications, however, require input voltages that may be too high for commonly available semiconductor devices. A two-switch forward converter, therefore, has been designed to accommodate semiconductor devices rated for approximately the input voltage. The addition of a second switch on the primary side of the transformer allows a reset voltage of the transformer and the input voltage to be divided between the two switches, thus reducing voltage stresses on each switch.

A practical concern regarding forward converters is that a magnetizing current of the transformer must be taken into consideration in the design of the converter. Otherwise, the magnetic energy stored in a core of the transformer by the magnetizing current may cause a failure in the converter. To facilitate the recovery of magnetizing energy from the transformer core to the input, the two-switch forward converter incorporates first and second diodes, each coupled between a rail of the input and the primary winding. During an off state of the switches, magnetizing energy flows from the transformer core to the input via the first and second diodes, allowing the transformer core to reset.

One inherent problem with the two-switch topology is that the reset voltage of the transformer is equal to the input voltage, thereby limiting a maximum duty cycle of the switches to 0.5. By operating the switches at the 0.5 duty cycle, however, the selection criteria for the switches and the turns ratio of the transformer are limited. Obviously, these aforementioned limitations detract from the use of forward converters and raise the costs associated therewith.

Accordingly, what is needed in the art is a system and method for resetting the transformer while, at the same time, maximizing the design flexibility and increasing the efficiency of the power converter.

SUMMARY OF THE INVENTION

To address the above-discussed deficiencies of the prior art, the present invention provides, for use with a power converter having first and second power switches coupled between a converter input and a primary winding of a transformer to impress an input voltage across the primary winding, a voltage clamp circuit for, and method of, resetting the transformer and a power converter employing the clamp circuit or the method. In one embodiment, the clamp circuit includes: (1) first and second reset windings coupled between the first and second power switches, (2) first and second energy storage devices coupled between the primary winding and the first and second reset windings, respectively, and (3) first and second switching circuits, coupled to the first reset winding and the second reset winding, respectively, that provide an electrical path from the primary winding to the converter input through the first and second reset windings, respectively, when the first and second power switches are not conducting.

The present invention therefore introduces the broad concept of resetting a transformer by transferring energy to reset windings (or to the converter input) via energy storage devices (such as capacitors). Employing the energy storage devices as an intermediate energy storage stage allows the duty cycle of the power switches to be increased above 50%, significantly increasing the power converter's efficiency and design flexibility.

In one embodiment of the present invention, the first and second switching circuits each include series-coupled first and second diodes. In a related embodiment, the first and second switching circuits each include a diode coupled between the first energy storage device and the first reset winding and between the second energy storage device and the second reset winding, respectively. The diodes resist forward converter currents from traveling through the reset windings and energy storage devices without requiring active control. Alternatively, controllable switches (such as transistors) may be employed to provide conduction and resistance as desired.

In one embodiment of the present invention, the first and second reset windings have identical numbers of turns. Of course, such is not necessary to the present invention.

In one embodiment of the present invention, wherein the first and second reset windings have about the same turns ratio, a maximum duty cycle of the first and second power switches is less than about 0.67 (for $N_2=N_3$ which is about ½ $N_1$). Thus, the present invention allows a duty cycle of the power switches to increase above 50%. Of course, it may still be advantageous to operate the power switches at a duty cycle equal to or less than 50%.

In one embodiment of the present invention, the first and second storage devices are of equivalent capacity. Of course, such is not necessary to the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
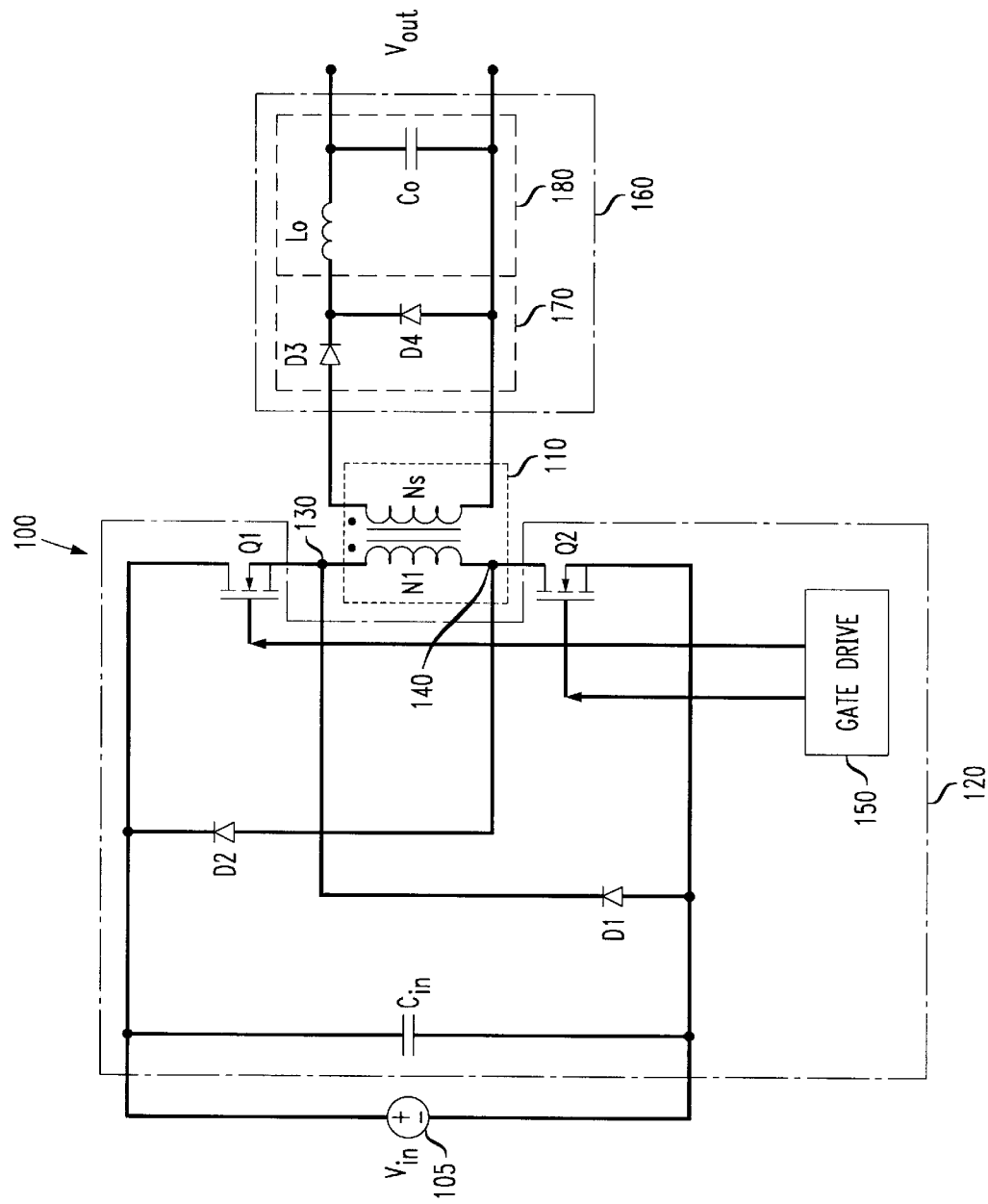
FIG. 1 illustrates a prior art two-switch forward converter.

Referring initially to FIG. 1, illustrated is a prior art two-switch forward converter 100. The forward converter 100 includes an isolation transformer 110 having primary and secondary windings N1, Ns. The forward converter 100 further includes a primary side circuit 120 and a secondary side circuit 160. A converter input is coupled to a source of DC power 105 having an input voltage Vin. A converter output provides an output voltage Vout to a load (not shown).

The primary side circuit 120 includes an input capacitor Cin, coupled across the converter input. The primary side circuit 120 further includes a first power switch Q1 coupled between a first rail of the converter input and the primary winding N1. The primary side circuit 120 further includes a second power switch Q2 coupled between the primary winding N1 and a second rail of the converter input. The first and second power switches Q1, Q2 and the primary winding N1 are thus parallel coupled across the converter input. The primary side circuit 120 further includes a first diode D1, coupled between the second rail and a first node 130, intermediate to the first power switch Q1 and the primary winding N1. The primary side circuit 120 further includes a second diode D2, coupled between the first rail and a second node 140, intermediate to the second power switch Q2 and the primary winding N1. The primary side circuit 120 still further includes a gate drive circuit 150 that controls the conduction periods of the first and second power switches Q1, Q2 as required.

The secondary side circuit 160 includes an output rectifier 170, consisting of rectifying diodes D3, D4, coupled across the secondary winding Ns. The secondary side circuit 160 still further includes an output filter 180, consisting of an output inductor Lo and an output capacitor Co, coupled across the converter output. The output rectifier 170 and the output filter 180 are well known in the art and, as a result, will not be described in detail.

The forward converter 100 operates as follows. During a first interval, the gate drive circuit 150 turns on the first and second power switches Q1, Q2 to apply the input voltage Vin across the primary winding N1. With the first and second power switches Q1, Q2 on, a magnetizing current associated with the transformer 110 rises as magnetizing energy is stored in the transformer 110. Then, during a complementary interval, the gate drive circuit 150 turns off the first and second power switches Q1, Q2. Magnetizing energy, stored in the transformer 110 by the magnetizing current, is now recovered and returned to the input via the first and second diodes D1, D2, thereby resetting the transformer 110.

The transformer 110 should be completely reset before the first and second power switches Q1, Q2 may be turned on again. Otherwise, magnetizing energy stored in the transformer 110 will ultimately result in converter 100 failure. In the conventional two-switch forward converter, the maximum reset voltage is equal to the input voltage. The duty cycle of the first and second power switches Q1, Q2, therefore, is limited to a maximum of 0.5.

The alternate switching action of the first and second power switches Q1, Q2 converts the input voltage Vin into an AC voltage required to operate the transformer 110. The transformer 110 then scales the AC voltage to an appropriate value. The scaled AC voltage is then rectified by the rectifier 170 and filtered by the output filter 180 to produce the output voltage Vout.

Obviously, increased efficiency is a continuing goal in the design of forward converters. One way to increase efficiency is to increase the maximum duty cycle of the first and second power switches Q1, Q2 of the forward converter beyond 0.5. Additionally, an increased duty cycle may result in a lower transformer 110 turns ratio, thereby increasing the efficiency of the forward converter 100.

Figure 2:
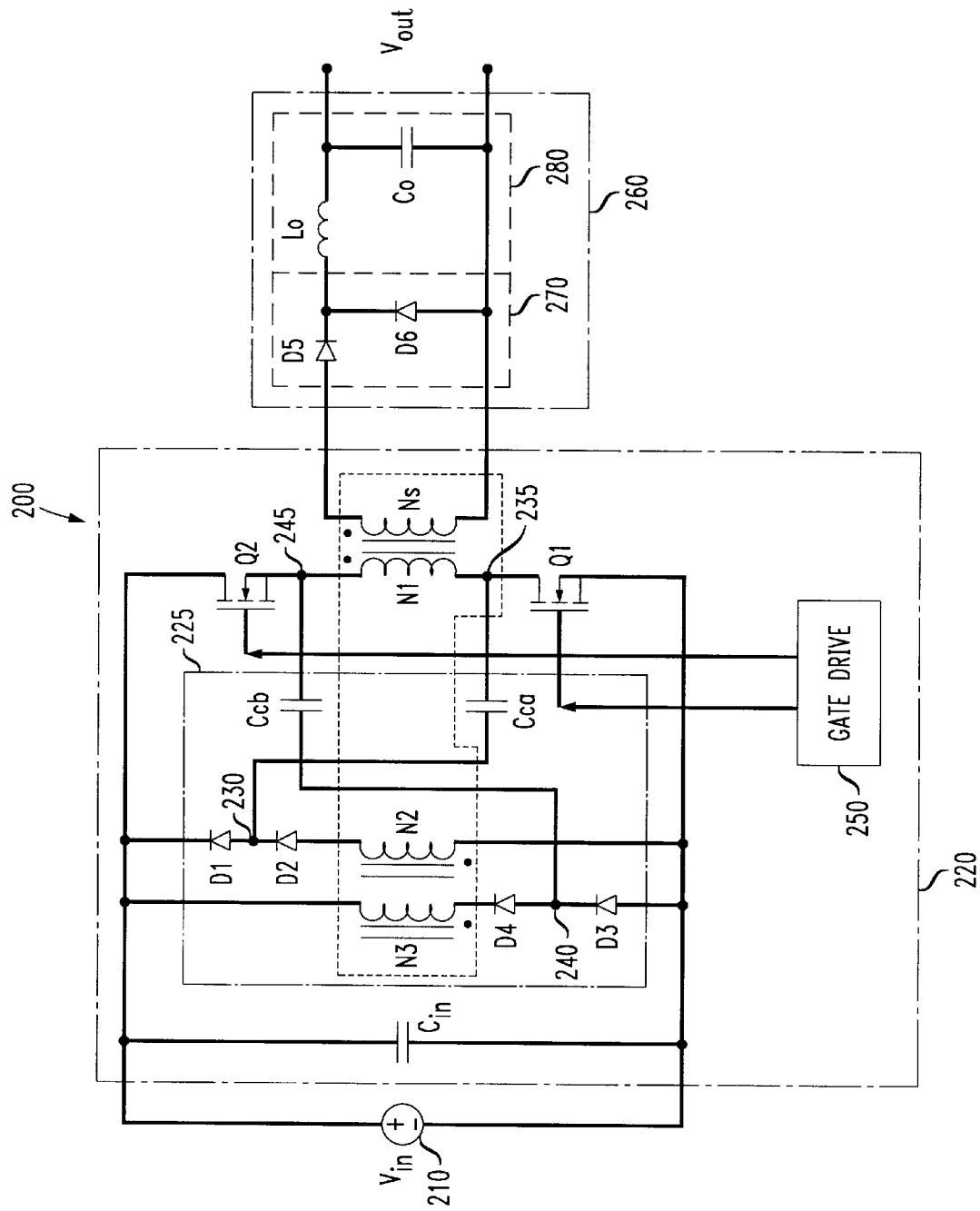
FIG. 2 illustrates an embodiment of a two-switch forward converter constructed according to the principles of the present invention.

Turning now to FIG. 2, illustrated is an embodiment of a two-switch forward converter (forward converter) 200 constructed according to the principles of the present invention. The forward converter 200 includes an isolation transformer having a primary winding N1 and a secondary winding Ns. The forward converter 200 further includes a primary side circuit 220 and a secondary side circuit 260. A converter input is coupled to a source of DC power 210 having an input voltage Vin. A converter output provides an output voltage Vout to a load (not shown).

The primary side circuit 220 includes an input capacitor Cin, coupled across first and second rails of the converter input. The primary side circuit 220 further includes a first power switch Q1 serially coupled between the primary winding N1 and the second rail. The primary side circuit 220 further includes a second power switch Q2 serially coupled between the first rail and the primary winding N1. The first and second power switches Q1, Q2 thus impress the input voltage Vin across the primary winding N1. The primary side circuit 220 further includes a voltage clamp circuit 225 for resetting the transformer. The primary side circuit 220 still further includes a gate drive circuit 250 that controls the conduction periods of the first and second power switches Q1, Q2 as necessary.

The voltage clamp circuit 225 includes a first reset winding N2 and a second reset winding N3. The voltage clamp circuit 225 further includes a first switching circuit consisting of first and second diodes D1, D2, serially coupled between the first rail and the first reset winding N2. The first and second diodes D1, D2, and the first reset winding N2 are parallel coupled across the first and second rails of the converter input. The voltage clamp circuit 225 further includes a second switching circuit consisting of third and fourth diodes D3, D4, serially coupled between the second reset winding N3 and the second rail. The third and fourth diodes D3, D4, and the second reset winding N3 are parallel coupled across the first and second rails of the converter input. The first and second switching circuits thus provide electrical paths from the primary winding to the converter input through the first and second reset windings, respectively, when the first and second power switches are not conducting. Of course, those skilled in the art will realize that the first and second switching circuits may not necessarily consist of diodes but, alternatively, may consist of active switches or other conventional switching circuitry.

The voltage clamp circuit 225 further includes first and second energy storage devices coupled between the primary winding N1 and the first and second reset windings N2, N3, respectively. In one embodiment, the first and second storage devices are of equivalent capacity. Alternatively, the first and second storage devices may be of different capacity. In the illustrated embodiment, the first energy storage device consists of a first clamp capacitor Cca, coupled between a first node 230, intermediate to the first and second diodes D1, D2, and a second node 235, intermediate to the primary winding N1 and the first power switch Q1. The second energy storage device, in the illustrated embodiment, consists of a second clamp capacitor Ccb, coupled between a third node 240, intermediate to the third and fourth diodes D3, D4, and a fourth node 245, intermediate to the second power switch Q2 and the primary winding N1.

The secondary side circuit 260 includes an output rectifier 270 and an output filter 280. Both the output rectifier 270 and the output filter 280 are well known in the art and, as a result, will not be discussed further.

The forward converter 200 operates as follows, assuming the primary winding N1 has more turns than the first and second reset windings N2, N3. During a first interval, the gate drive circuit 250 turns on the first and second power switches Q1, Q2 to apply the input voltage Vin across the primary winding N1. As the first and second power switches Q1, Q2 turn on, a magnetizing current associated with the transformer rises as energy is stored in the transformer. With the first and second power switches Q1, Q2 on, the first and second clamp capacitors Cca, Ccb are reset. The first and second clamp capacitors may thus discharge to a voltage equal to N2/N1*Vin.

At turn-off, the first and second clamp capacitors Cca, Ccb clamp the voltages across the first and second power switches Q1, Q2, respectively, to about a sum of the input voltage Vin and a voltage Vcc (wherein Vcc=Vin*(N2/N1), for N2<N1), thereby too providing the first and second power switches Q1, Q2 with relief from excessive voltage stress. Assuming the first and second reset windings N2, N3 have an identical number of turns, the transformer reset voltage may then be represented as Vin+2*Vin*(N2/N1). With a reset voltage greater than Vin, the duty cycle of the first and second power switches may be increased beyond 0.5.

A maximum voltage stress VDSmax across each of the first and second power switches may then be represented as VDSmax=Vin+Vin *(N2/N1). Of course, the first and second reset windings N2, N3 may have a different number of turns. If so, the first and second power switches Q1, Q2 will operate with different voltage stresses. Furthermore, if the primary winding N1 has less turns than the first and second reset windings N2, N3, the voltage Vcc may then be represented as (N1/N2)*Vin. In this case, the first and second clamp capacitors Cca, Ccb reset during an off state of the first and second power switches Q1, Q2.

Those skilled in the art should understand that the previously described embodiments of the forward converter and clamp circuit are submitted for illustrative purposes only and other embodiments capable of increasing the duty cycle of the power switch (preferably, above 0.5) are well within the broad scope of the present invention. Additionally, exemplary embodiments of the present invention have been illustrated above with reference to specific electronic and magnetic components. Those skilled in the art are aware, however, that components may be substituted (not necessarily with components of the same type) to create desired conditions or accomplish desired results. For instance, multiple components may be substituted for a single component and vice-versa. Similarly, although a magnetic device having a single core and a single primary winding has been illustrated, other configurations, such as magnetic devices having multiple primary windings or multiple cores, may be used to accomplish essentially the same results disclosed by the present invention. Also, the concepts of the present invention may be employed with other circuit topologies.

For a better understanding of power electronics, including power rectifiers and boost converters, see *Power Electronics: Converters, Applications and Design*, by N. Mohan, T. M. Undeland and W. P. Robbins, John Wiley & Sons Publishing Company (1989), incorporated herein by reference.

Although the present invention has been described in detail, those skilled in the art should understand that they can make various changes, substitutions and alterations herein without departing from the spirit and scope of the invention in its broadest form.

What is claimed is:

1. For use with a power converter having first and second power switches coupled between a converter input and a primary winding of a transformer to impress an input voltage across said primary winding, a voltage clamp circuit for resetting said transformer, comprising:

first and second reset windings coupled between said first and second power switches;

first and second energy storage devices coupled between said primary winding and said first and second reset windings, respectively; and first and second switching circuits, coupled to said first reset winding and said second reset winding, respectively, that provide an electrical path from said primary winding to said converter input through said first and second reset windings, respectively, when said first and second power switches are not conducting.

2. The clamp circuit as recited in claim 1 wherein said first and second storage devices are capacitors.

3. The clamp circuit as recited in claim 1 wherein said first and second switching circuits each comprise series-coupled first and second diodes.

4. The clamp circuit as recited in claim 1 wherein said first and second switching circuits each comprise a diode coupled between said first energy storage device and said first reset winding and between said second energy storage device and said second reset winding, respectively.

5. The clamp circuit as recited in claim 1 wherein said first and second reset windings have identical numbers of turns.

6. The clamp circuit as recited in claim 1 wherein a maximum duty cycle of said first and second power switches is less than about 0.67.

7. The clamp circuit as recited in claim 1 wherein said first and second storage devices are of equivalent capacity.

8. For use with a power converter having first and second power switches coupled between a converter input and a primary winding of a transformer to impress an input voltage across said primary winding, a method of resetting said transformer, comprising the steps of:

energizing first and second energy storage devices coupled to said primary winding; and transferring electrical power from said first and second storage devices to first and second reset windings of said transformer via first and second switching circuits, respectively, when said first and second power switches are not conducting.

9. The method as recited in claim 8 wherein said first and second storage devices are capacitors.

10. The method as recited in claim 8 wherein said first and second switching circuits each comprise series-coupled first and second diodes.

11. The method as recited in claim 8 wherein said first and second switching circuits each comprise a diode coupled between said first energy storage device and said first reset winding and between said second energy storage device and said second reset winding, respectively.

12. The method as recited in claim 8 wherein said first and second reset windings have identical numbers of turns.

13. The method as recited in claim 8 wherein a maximum duty cycle of said first and second power switches is less than about 0.67.

14. The method as recited in claim 8 wherein said first and second storage devices are of equivalent capacity.

15. A power converter, comprising:

a transformer having a primary winding and a secondary winding;

first and second power switches coupled between a converter input and said primary winding to impress an input voltage thereacross; and a voltage clamp circuit for resetting said transformer, including:

first and second reset windings coupled between said first and second power switches, first and second energy storage devices coupled between said primary winding and said first and second reset windings, respectively, and first and second switching circuits, coupled to said first reset winding and said second reset winding, respectively, that provide an electrical path from said primary winding to said converter input through said first and second reset windings, respectively, when said first and second power switches are not conducting.

16. The power converter as recited in claim 15 wherein said first and second storage devices are capacitors.

17. The power converter as recited in claim 15 wherein said first and second switching circuits each comprise series-coupled first and second diodes.

18. The power converter as recited in claim 15 wherein said first and second switching circuits each comprise a diode coupled between said first energy storage device and said first reset winding and between said second energy storage device and said second reset winding, respectively.

19. The power converter as recited in claim 15 wherein said first and second reset windings have identical numbers of turns.

20. The power converter as recited in claim 15 wherein a maximum duty cycle of said first and second power switches is less than about 0.67.

21. The power converter as recited in claim 15 wherein said first and second storage devices are of equivalent capacity.

* * * * *